(12) United States Patent
Catalano et al.

(10) Patent No.: US 7,699,494 B2
(45) Date of Patent: Apr. 20, 2010

(54) REPLACEMENT ILLUMINATION DEVICE FOR A MINIATURE FLASHLIGHT BULB

(75) Inventors: Anthony Catalano, Boulder, CO (US); Daniel Harrison, Nederland, CO (US)

(73) Assignee: TerraLux, Inc., Boulder, CO (US)

( * ) Notice: Subject to any disclaimer, the term of this patent is extended or adjusted under 35 U.S.C. 154(b) by 0 days.

(21) Appl. No.: 12/244,645

(22) Filed: Oct. 2, 2008

(65) Prior Publication Data

US 2009/0034262 A1    Feb. 5, 2009

Related U.S. Application Data

(63) Continuation of application No. 11/831,791, filed on Jul. 31, 2007, now Pat. No. 7,448,770, which is a continuation of application No. 11/026,796, filed on Dec. 31, 2004, now Pat. No. 7,300,173, which is a continuation-in-part of application No. 10/820,930, filed on Apr. 8, 2004, now Pat. No. 7,318,661.

(51) Int. Cl.
*F21L 4/04* (2006.01)

(52) U.S. Cl. .................. 362/202; 362/208; 362/294; 362/800

(58) Field of Classification Search ................ 362/157, 362/184, 194–208, 253, 800, 294
See application file for complete search history.

(56) References Cited

U.S. PATENT DOCUMENTS

| | | | |
|---|---|---|---|
| 3,795,830 A | 3/1974 | Richardson | |
| 4,211,955 A | 7/1980 | Ray | |
| 4,727,289 A | 2/1988 | Uchida | |
| 5,097,180 A | 3/1992 | Ignon | |
| 5,189,339 A | 2/1993 | Peshak | |
| 5,222,800 A | 6/1993 | Chan et al. | |
| 5,463,280 A | 10/1995 | Johnson | |
| 5,465,197 A | 11/1995 | Chien | |
| 5,561,346 A | 10/1996 | Byrne | |
| 5,575,459 A | 11/1996 | Anderson | |
| 5,632,551 A | 5/1997 | Roney et al. | |
| 5,655,830 A | 8/1997 | Ruskouski | |
| 5,663,719 A | 9/1997 | Deese et al. | |
| 5,850,126 A | 12/1998 | Kanbar | |
| 5,936,599 A | 8/1999 | Reymond | |
| 5,994,845 A | 11/1999 | Gibboney, Jr. | |
| 6,019,493 A | 2/2000 | Kuo et al. | |
| 6,091,614 A | 7/2000 | Malenfant | |
| 6,140,776 A | 10/2000 | Rachwal | |
| 6,150,771 A | 11/2000 | Perry | |
| 6,190,020 B1 | 2/2001 | Hartley | |
| 6,218,785 B1 | 4/2001 | Incerti | |
| 6,220,722 B1 * | 4/2001 | Begemann | 362/231 |
| 6,232,784 B1 | 5/2001 | Dulasky | |
| 6,234,648 B1 | 5/2001 | Borner et al. | |
| 6,310,445 B1 | 10/2001 | Kashaninejad | |
| 6,371,636 B1 | 4/2002 | Wesson | |
| 6,380,865 B1 | 4/2002 | Pederson | |

(Continued)

FOREIGN PATENT DOCUMENTS

JP    2004146205 A    5/2004

*Primary Examiner*—Bao Q Truong
(74) *Attorney, Agent, or Firm*—Pritzkau Patent Group, LLC.

(57) ABSTRACT

Disclosed is a method and apparatus for providing a solid state light emitter and driving circuitry integrated into a component module that will retrofit common incandescent light bulb applications.

5 Claims, 3 Drawing Sheets

U.S. PATENT DOCUMENTS

| | | |
|---|---|---|
| 6,485,160 B1 | 11/2002 | Sommers et al. |
| 6,528,954 B1 | 3/2003 | Lys et al. |
| 6,570,505 B1 | 5/2003 | Malenfant |
| 6,580,228 B1 * | 6/2003 | Chen et al. ............. 315/185 R |
| 6,644,841 B2 | 11/2003 | Martineau |
| 6,727,652 B2 | 4/2004 | Sivacumarran |
| 6,791,283 B2 | 9/2004 | Bowman et al. |
| 6,793,374 B2 * | 9/2004 | Begemann ................. 362/294 |
| 6,819,056 B2 | 11/2004 | Lin |
| 6,893,140 B2 | 5/2005 | Storey et al. |
| 6,924,606 B2 | 8/2005 | Yu et al. |
| 6,948,829 B2 * | 9/2005 | Verdes et al. ............... 362/227 |
| 6,957,897 B1 | 10/2005 | Nelson et al. |
| 6,981,784 B2 | 1/2006 | Dubue |
| 7,008,084 B2 | 3/2006 | Galli |
| 7,015,650 B2 | 3/2006 | McGrath |
| 7,204,602 B2 * | 4/2007 | Archer ....................... 362/101 |
| 2001/0014019 A1 * | 8/2001 | Begemann .................. 362/231 |
| 2002/0141196 A1 | 10/2002 | Camarota et al. |
| 2003/0039122 A1 * | 2/2003 | Cao .......................... 362/294 |
| 2003/0067787 A1 | 4/2003 | Serizawa |
| 2003/0112627 A1 | 6/2003 | Deese |
| 2003/0210552 A1 | 11/2003 | Barlian et al. |
| 2004/0070990 A1 | 4/2004 | Szypszak |
| 2004/0189262 A1 | 9/2004 | McGrath |
| 2005/0052865 A1 | 3/2005 | Siktberg et al. |

* cited by examiner

REPLACEMENT ILLUMINATION DEVICE FOR A MINIATURE FLASHLIGHT BULB

CROSS-REFERENCE TO RELATED APPLICATIONS

This application is a continuation application of copending application Ser. No. 11/831,791 filed on Jul. 31, 2007, now U.S. Pat. No. 7,448,770 which is a continuation of application Ser. No. 11/026,796 filed on Dec. 31, 2004 and issued as U.S. Pat. No. 7,300,173 on Nov. 27, 2007; which is a continuation-in-part of application Ser. No. 10/820,930 filed Apr. 8, 2004 and issued as U.S. Pat. No. 7,318,661 on Jan. 15, 2008; from which priority under 35 U.S.C. §120 is claimed and the disclosures of which are incorporated herein by reference.

FIELD OF INVENTION

This invention relates to a solid state replacement for a miniature bulb in a flashlight.

BACKGROUND

Non-provisional patent application Ser. No. 10/820,930, filed on Apr. 8, 2004, described an invention which can replace incandescent light bulbs with more efficient light emitters such as light-emitting diodes (LEDs). The Background section of that patent application provided the justification for doing so, and it is incorporated herein by reference.

However, the description of the embodiment of that invention of that prior patent application and its claims prescribed circuitry which fit within the 3-d spatial envelope defined by the incandescent bulb, which is replaced by an instance of that prior invention. Furthermore, although instances of that invention would include flashlight bulbs, it did not focus in particular on the problem imposed by flashlights with tiny incandescent bulbs. The above-referenced, previous patent application described circuitry using current off-the-shelf components and a printed circuit board to employ them. Although it may be technologically possible, it is not economically attractive to implement that invention in a form that will fit entirely inside the spatial envelope of certain tiny standard incandescent light bulbs. For example, a so-called "grain-of-wheat" bulb is aptly named and would present an implementation challenge to fit all the circuitry of the above invention, as well as a light-emitting, solid state, semiconductor chip in such a small volume at a reasonable cost for a consumer product. This would currently apply to any light bulb which is, for instance, less than about 5 millimeters in diameter.

Therefore, in light of the foregoing limitation, the first objective of this invention is to provide a replacement light source for very small incandescent bulbs which employs the principles and circuitry of the aforementioned prior patent application, but where the invention is not limited in size by the envelope of the bulb it is replacing. Implicit in this first objective is the more efficient use of the batteries than with an incandescent bulb: providing longer battery life for the same light intensity or providing brighter light for the same battery life or a compromise in-between. Also implicit in the first objective is presumed advantage that solid state light emitters have over incandescent filaments regarding their relative expected operational lifetimes.

A second objective is to do this is a way which minimizes the cost and the effort for a consumer to retrofit the replacement. A third objective is to provide a replacement light source which fits entirely within the envelope of a commercially available, consumer flashlight, and which ideally still uses the type and same number of batteries for which the flashlight was designed. A fourth objective is to preserve the attractive features possessed by the flashlight before the incandescent bulb was replaced. These features may include, for example, user-adjusted beam focus and the on-off switch function (which itself may be integrated with the beam focus feature).

The principal advantage of such an illumination device is that the advantages of solid state illumination can be more quickly offered to consumers for a variety of existing flashlight models, without requiring them to buy a new, custom-designed flashlight. It also allows the consumer to revert back to the incandescent bulb if necessary.

SUMMARY OF THE INVENTION

To accomplish the stated objectives, the present invention comprises essentially the same elements as U.S. patent application Ser. No. 10/820,930, the summary of which is incorporated herein by reference. These elements include a standard light bulb power connector, at least one light emitter, and a driving circuit embedded in a module. The power connector provides a conductive contact with a electrical power source (typically batteries) and normally also provides physical support too. The light emitter typically would be a light emitting diode (LED) or other such solid state device. The module typically is a miniature printed circuit board. The flashlight to be upgraded with the present invention and the batteries are not elements per se of the invention, but clearly they are necessary for its operation. For certain cases, the invention also comprises an additional element: namely a resized reflector to replace the original one.

Although the elements are the same as in patent application Ser. No. 10/820,930, some constraints on them differ. Most importantly, the light emitter and its drive circuitry need not fit entirely within the spatial envelope defined by the bulb surrounding the filament of the miniature incandescent light source. Nevertheless, the drive circuitry must fit within the flashlight in such a way that the battery compartment volume remains fixed—or at least it is changed so little that the same number and type of batteries can still be used in it. Furthermore, existing attractive features such as the on-off switch and user-adjusted beam focusing (if previously present) must not be degraded.

A specific instance of such a flashlight is the popular, consumer flashlight known as the Mini Maglite®, manufactured by Mag Instrument, Inc. For it, user-adjusted focusing and its integrated, twist-activated switch must be preserved by the present invention. Furthermore, for a model which uses N dry cells as batteries, the model should continue to use the same N cells after retrofitting the flashlight with the present invention. However, to accomplish the retrofit, space for the driver circuit module must be acquired somewhere. In this specific case, this is accomplished by providing an inexpensive replacement parabolic reflector, nearly like the original, but slightly shorter. This approach could be used for retrofitting other flashlights having tiny light bulbs. In other cases, it might be possible to "steal" some space from battery compartment—if for example a spring which holds the batteries in place provides enough extra leeway for the thickness of the driver circuit module.

The method of retrofitting the illumination source while retaining other existing flashlight features, such as user-adjusted beam focus, comprises steps of providing a power connection equivalent to the original incandescent light bulb, physically and electrically connecting a circuit module to the power connection, physically and electrically connecting the circuit to a light emitter (such as an LED), fitting the module and light emitter into the body of the flashlight, maintaining sufficient spatial volume for the original batteries, and regulating the input power efficiently to supply ideal power to the light emitter. In some cases, the method comprises an additional step: replacing the existing reflector with a replacement reflector (generally slightly shorter).

Of course, a flashlight with N batteries (N greater than 1) could be retrofitted with a module which replaces one of the batteries, but this is less than desirable, because it significantly reduces the available energy—negating the advantage of the solid state light source over the incandescent bulb regarding extended battery life.

While the primary application of this invention is in flashlights, the principles clearly could be used in other illumination systems which employ tiny incandescent light bulbs. However, a very specific objective of this invention is to replace the incandescent light bulb in the Mini Maglite® and the like.

DESCRIPTION OF THE DRAWINGS

The accompanying drawings, which are incorporated herein and form a part of the specification, illustrate a preferred embodiment of the present invention and, together with the description, serve to explain the principle of the invention.

Figure 1:
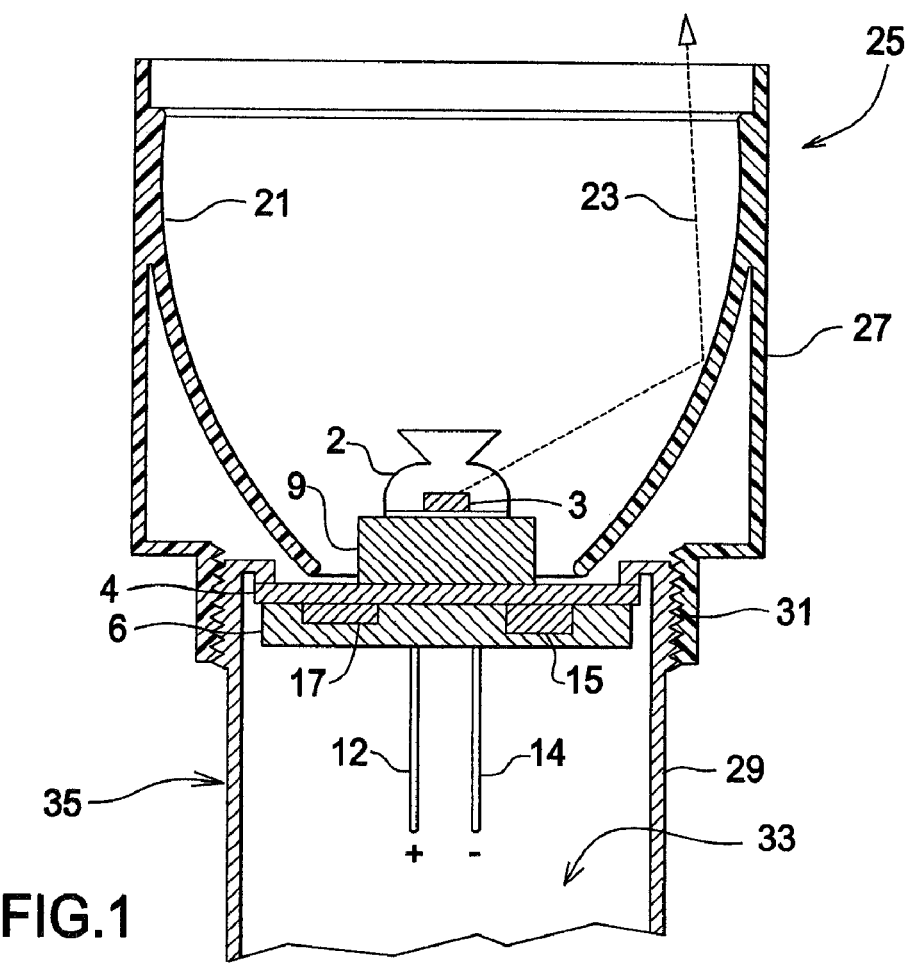
FIG. 1 is a cross-sectional view of the invention, including a reflector.

The numeric identifiers in the figures correspond to the elements as follows:

2 a transparent lens adapted to emit a majority of the light peripherally

3 at least one light-emitting semiconductor chip

4 a small (round) printed circuit board

6 hard protective material encasing the electronic components 15 and 17

9 a socket for the LED module comprising 2 and 3

12 the pin to be electrically connected to the positive side of the battery pack

14 the pin to be electrically connected to the negative side of the battery pack

15 an exemplary integrated circuit (IC) component

17 another integrated circuit (IC) component

21 replacement reflector (shorter than original), if necessary

22 lens replacing normal protective transparent window

23 exemplary focused light ray

302, . . . , 333 components of the driving circuit

DETAILED DESCRIPTION OF A PREFERRED EMBODIMENT

Figure 2:
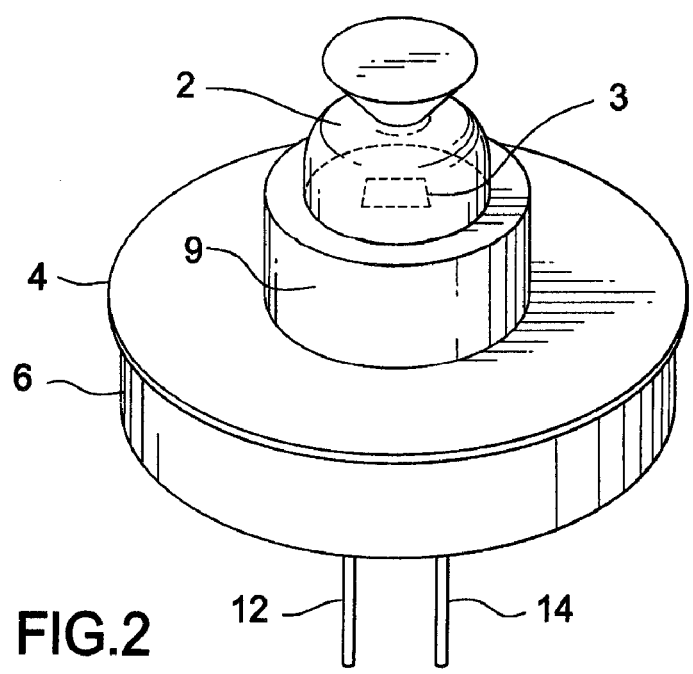
FIG. 2 is a perspective view, without showing a reflector.

A perspective view of a preferred physical form for this invention is shown in FIG. 2. A cross-section of FIG. 2 appears as FIG. 1.

In FIG. 1, the standard light bulb power connector is shown as pins 12 and 14, respectively conductively connected to the positive and negative power source of the flashlight (presumably batteries). The light emitter 3 typically would be an LED chip embedded in a transparent plastic lens 2 and a driving circuit embedded in a module. (Of course, potentially more than one light emitting chip could be used, perhaps to simulate white light with multiple chips each emitting a different wavelength.)

Also in FIG. 1, the transparent lens 2 of the light emitter preferably is so shaped that it refracts a majority of the emitted light laterally toward the reflector 21. Reflector 21 would ideally have the shape of a portion of a paraboloid, with the light-emitting chip 3 on the centerline (axis of revolution) near the focal point of the paraboloid. Alternatively, reflector 21 could simply be a portion of a cone. The reflector of the Mini Maglite® and its housing may be rotated with respect to the flashlight barrel and is attached thereto by the helically threaded, mating portions of the barrel and housing. As the reflector is rotated its focal point is moved along the centerline relative to the light-emitting chip 3. As the focal point is moved relative to the chip 3, the shape of the beam reflected off the reflector 21 is changed from a broad cone-like beam to a narrower beam. Light ray 23 is exemplary of all such rays composing the beam.

Because of the tiny size of the incandescent bulbs used in miniature flashlights, a inexpensive, conventionally-implemented driving circuit for a solid state replacement source of light would not fit within the volume envelope of the miniature bulb. Therefore, it must be at least partly exterior to that envelope. The driver circuit module of the present invention comprises a small conventional printed circuit board 4, circuit components (such as commercially available integrated circuits represented by elements 15 and 17 in FIG. 1), a potting layer 6 protecting those circuit components, a socket 9 for the support and conductor leads of the light emitter (LED), and pins 12 and 14 equivalent to the connector of the original incandescent bulb. (In the case of other types of miniature bulbs, the pins 12 and 14 might be instead some other type of connector, such as a standard screw or bayonet light bulb base.) The dimensions of the module for the Mini Maglite®, for example, would be about 15 mm in diameter and about 3 mm thick—larger than the original incandescent bulb.

Furthermore, if the flashlight has a lens housing which rotates, the module 6 provides a low friction surface in order for the reflector 21 to readily turn as it contacts module to preserve the focusing capability or to preserve the on-off switch capability.

Still further, the protective material of the module 6 must facilitate radiation and conduction of heat away from the light emitters and from the supporting circuit elements in module 6. The material, for instance, may be a thermally conductive epoxy. To increase the transfer of heat from that material to the surrounding atmosphere, the module is geometrically shaped to maximize surface area within the limited volume to facilitate the radiation of heat from the emitters and the module. Besides the gross geometry of the module 6, the surface of the module may be textured to increase its surface area. To increase the radiation of unwanted heat, the reflector itself could be fashioned from a thermally conductive material such as stamped aluminum. This would be particularly effective, because it directly contacts the module 6 in the preferred embodiment and because it has a relatively large surface area.

In flashlights like the Mini Maglite®, there would not be any available space for the driver circuit module. So, for such cases, a replacement reflector is an optional, additional element of the invention. The replacement reflector 21 would be essentially identical to the original reflector, except that a small rear portion is removed to account for the thickness of the driver circuit printed circuit board 4 and protective potting 6. Assuming that the light emitting chip 3 occupies approximately the same optical location as the filament of the original incandescent bulb, the shape of the replacement would be equivalent to the original, except for the small portion removed from the smaller open end. (Otherwise, the replacement reflector 21 would be modified slightly in shape to account for the new position of the chip relative to the original position of the filament. That is, the relationship of the focal point of the new reflector to the chip would be about the same as the relationship of the focal point of the old reflector to the filament.)

Figure 4:
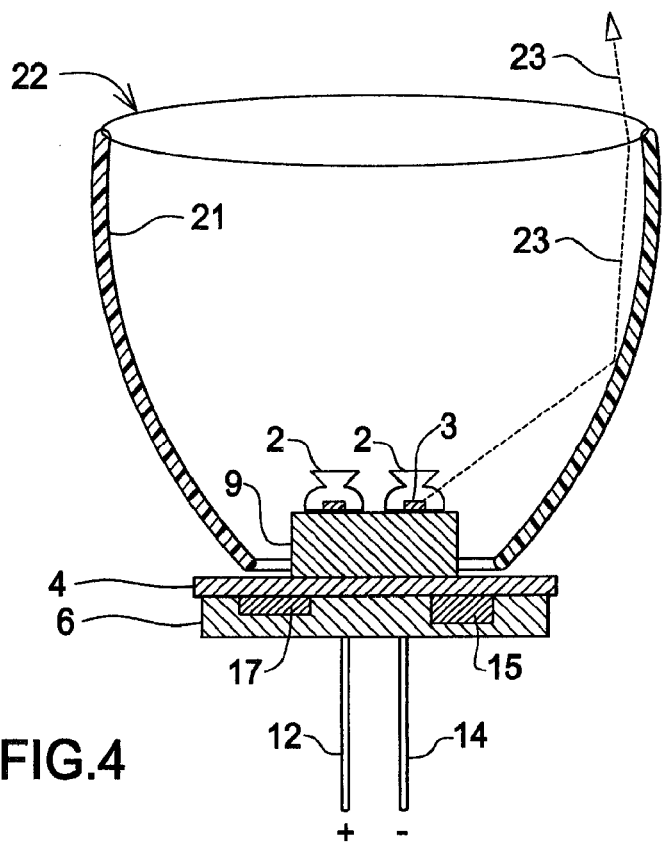
FIG. 4 is similar to FIG. 1, except that it employs multiple LEDs and a converging lens.

An alternative embodiment is shown in FIG. 4. In it there are several smaller LEDs instead of one larger one. The disadvantage of this arrangement is that the LEDs are off the midline axis, so the light will be spread out farther than with the case of FIG. 1. One partial remedy would be to replace the usual flat protective window of the flashlight with a (converging) lens. One advantage of multiple LEDs is that they could generate an approximation to white light by mixing the colors of several LEDs (such as that of red, green, and blue LEDs). Using a diffusing lens 22 (or reflector 21) which has a stippled or pebbled surface would smooth the appearance of the light, especially when multiple LEDs are present.

Figure 3:
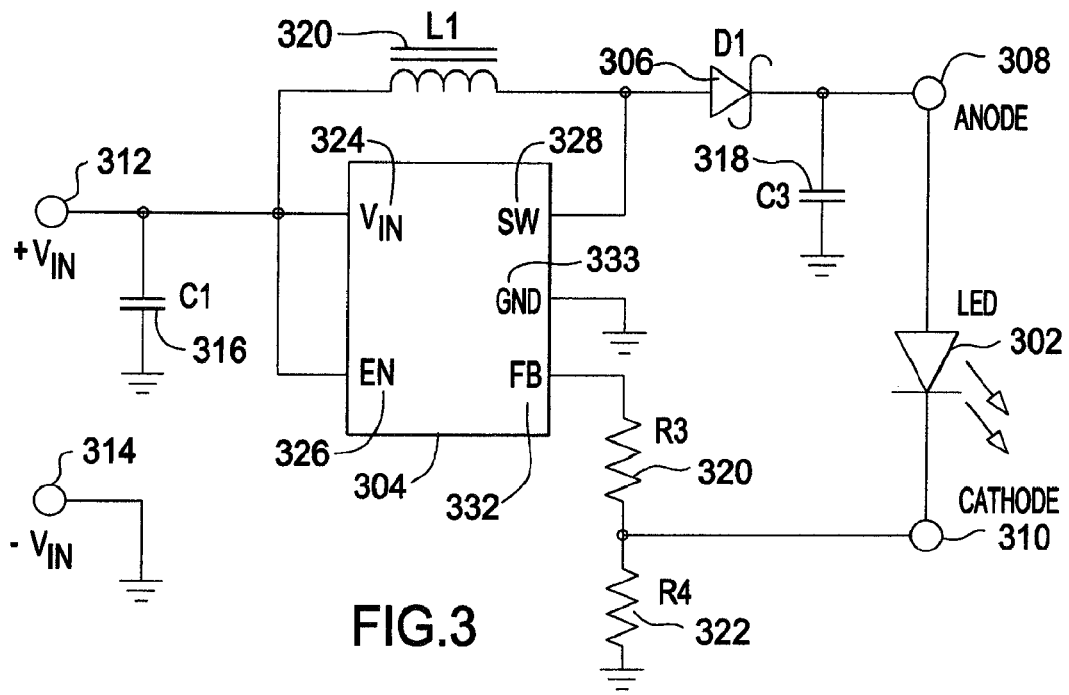
FIG. 3 is a schematic diagram of an exemplary circuit implementing the driving circuit of this invention.

A preferred embodiment of the driver circuit for this invention is shown in schematic diagram in FIG. 3, which shows a DC circuit used for a typical embodiment. A high frequency, low power DC-to-DC converter circuit is utilized to drive the LED 302. The high frequency of operation allows components of small size to be used. A positive voltage source is introduced at +Vin 312 and branched to a capacitor C1 316 and inductor L1 320 and to two inputs (Vin 324 and EN 326) of a switching circuit 304. The solid-state switching circuit 304 regulates the input voltage Vin 324 to a specified value to achieve a switched output at SW 328 by receiving an enable signal EN 326 branched from Vin 324. The inductor L1 320 is charged during the ON cycle phase of SW 328 and discharges in the OFF cycle phase to achieve the desired switched voltage output driving a Schottky diode D1 306 that in turn drives the anode side 308 of the output LED 302 and capacitor C3 318 which is terminated to ground. This Schottky diode D1 306 allows the current to flow in only one direction to the anode side 308 of the LED 302 via SW 328. The Schottky diode D1 306 also assures that there is a quantity of rectification of the AC signal flowing through the circuit so that the LED only sees half of the AC cycle, effectively acting as a DC signal. Capacitor C3 318 becomes a charge reservoir, averaging out what would otherwise be a sinusoidally varying voltage with one half of the sine wave missing.

The cathode side 310 of the LED 302 is pass through ground via R-4 322 and branched to the feedback FB pin 332 of the switching circuit 304 through resistor R3 320. The FB pin 332 acts as half of an operational amplifier that is comparing the voltage at R-4 322 above ground, to a reference voltage, (i.e., 1.23V). When the voltage at R4 322 reaches its reference voltage, the switching circuit 304 stops supplying current. The FB pin 332 therefore serves as feedback reference within the switching circuit 304, determining the current values by comparing a feedback voltage to its internal reference and deciding whether more or less charge is needed, thereby regulating the circuit current. −Vin 314, capacitors C1 316 and C3 318, resistor R4 322 and the ground terminal 330 of the switching circuit 304 are all terminated to ground.

In a constant current implementation, a current sense resistor is used to provide the voltage feedback. An integrated circuit of small size, Texas Instruments TPS61040 or TPS61041 is suitable for this purpose. Although designed for DC-to-DC operation in a suitable voltage range, the circuit can be easily modified to work at higher voltages by using a zener diode resistor combination, or to operate as an AC-to-DC converter by adding a rectifier circuit. Additional operational features such as light sensors, timers, etc., could be added to provide for dimming or automatic shut-off functions. Multiple colored LEDs can be used to vary the desired colored output. Although only one LED is shown, several LEDs can be combined in a series circuit, parallel circuit or series-parallel circuit up to the limitations of the IC used. An appropriate LED may be chosen for use in this circuit to suit the particular application and sized to closely match the bulb dimensions and intensities of conventional lamps. The circuit shown in FIG. 3 can be implemented in either a constant voltage output design or a constant current output design. The constant current design has advantages since light output is directly proportional to current, whereas slight variations in the LED manufacture require different operating voltages for a specific light output.

Figure 5:
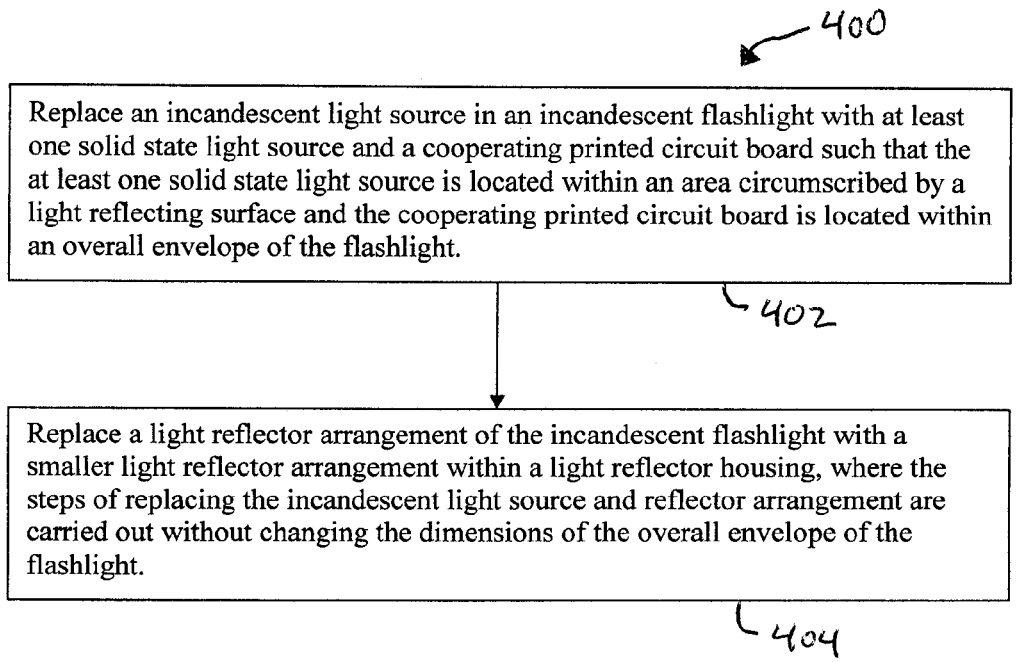
FIG. 5 is a flow diagram of a flashlight related method.

As shown in method 400 in FIG. 5, an incandescent light source in an incandescent flashlight can be replaced with at least one solid state light source and a cooperating printed circuit board such that the at least one solid state light source is located within an area circumscribed by a light reflecting surface and the cooperating printed circuit board is located within an overall envelope of the flashlight, (step 402). A light reflector arrangement of the incandescent flashlight can be replaced with a smaller light reflector arrangement within a light reflector housing, and the steps of replacing the incandescent light source and reflector arrangement are carried out without changing the dimensions of the overall envelope of the flashlight, (step 404).

Figure 6:
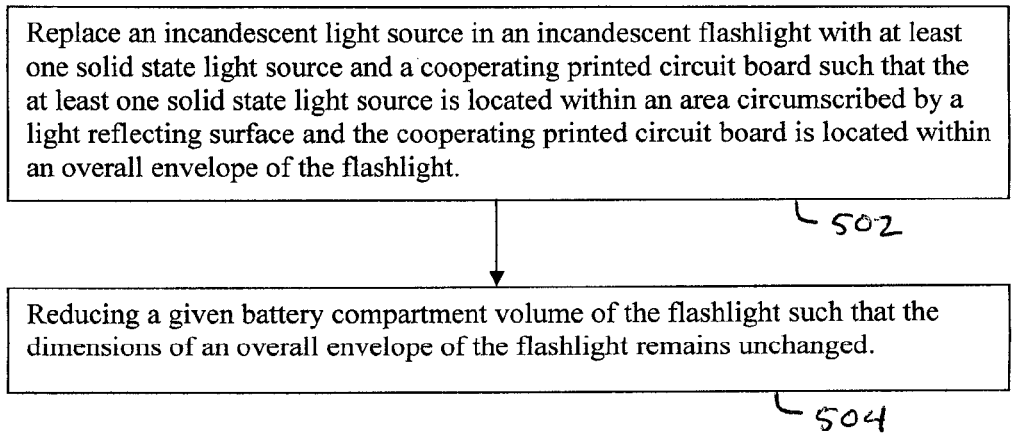
FIG. 6 is another flow diagram of a flashlight related method.

As shown in method 500 in FIG. 6, an incandescent light source can be replaced in an incandescent flashlight with at least one solid state light source and a cooperating printed circuit board such that the at least one solid state light source is located within an area circumscribed by a light reflecting surface and the cooperating printed circuit board is located within an overall envelope of the flashlight, (step 502). A given battery compartment volume of the flashlight can be reduced such that the dimensions of an overall envelope of the flashlight remains unchanged, (step 504).

While this invention is described above with reference to a preferred embodiment, anyone skilled in the art can readily visualize other embodiments of this invention. For example, circuits other than the one described could be used. Also, other shapes for the refractive LED enclosure 2 could be used. Therefore, the scope and content of this invention are not limited by the foregoing description. Rather, the scope and content are delineated by the following claims.

What is claimed is:

1. In an incandescent light projecting illumination system for producing light using electrical energy, including:
    an incandescent lamp having a base with a configuration that is used for connecting with a power source to receive electrical energy from the power source to produce light; and
    a lens positioned for directing light from the incandescent lamp out of the illumination system when the incandescent lamp is connected with the power source, the lens at least partially surrounding the incandescent lamp when the incandescent lamp is positioned for directing light, a method comprising:
        configuring a component module with a module base that has a shape that is substantially the same as the incandescent lamp base to allow the light module to connect to the power source in place of the incandescent lamp, the light module having a driving circuit at least for converting the electrical energy from the power source to a converted electrical energy that is in a different form than the electrical energy provided by the power source, and having a solid state light emitter that produces light in response to the converted electrical energy;

positioning the solid state light emitter in the solid state light module where at least some light produced by the solid state light emitter is directed out of the illumination system by the lens when the module base is connected with the power source.

2. The method as defined in claim 1 further comprising:

inserting the solid state light emitter into the lens in an end of the lens that is substantially opposite from an end of the lens such that at least some of the light is directed out of the illumination system by the lens.

3. The method as defined in claim 2, including configuring the component module to include a heat sink device that is attached with the solid state light emitter for conducting heat away from the solid state light emitter and inserting the solid state light emitter into the lens on heat sink device.

4. The method as defined in claim 1, wherein the lens is a first lens, the method further comprising:

replacing the first lens with a second, different lens that is arranged to cooperate with the solid state light emitter to direct more of the light from the solid state light emitter out of the illumination system than the first lens.

5. The method as defined in claim 1, wherein the lens is a first lens, the method further comprising:

replacing the first lens with a second, different lens that has a dimension that is shorter than a dimension of the first lens in a way which creates space for the driving circuit.

* * * * *